United States Patent [19]
Harada et al.

[11] Patent Number: 5,445,786
[45] Date of Patent: Aug. 29, 1995

[54] HEAT-RESISTANT METAL MONOLITH AND MANUFACTURING METHOD THEREFOR

[75] Inventors: Takashi Harada, Nagoya; Hiroshige Mizuno, Tajimi; Fumio Abe, Handa; Tsuneaki Ohashi, Ohgaki, all of Japan

[73] Assignee: NGK Insulators, Ltd., Japan

[21] Appl. No.: 354,889

[22] Filed: Dec. 9, 1994

Related U.S. Application Data

[60] Continuation of Ser. No. 118,771, Sep. 10, 1993, abandoned, which is a division of Ser. No. 955,247, Oct. 1, 1992, Pat. No. 5,292,485, which is a continuation of Ser. No. 545,488, Jun. 29, 1990, abandoned.

[30] Foreign Application Priority Data

Apr. 3, 1990 [JP] Japan ................... 2-88955

[51] Int. Cl.$^6$ ................................ B22F 3/12
[52] U.S. Cl. ..................... 419/2; 419/10; 419/19; 419/36; 419/41; 419/45; 419/57
[58] Field of Search ............ 419/2, 10, 19, 36, 41, 419/45, 57

[56] References Cited

U.S. PATENT DOCUMENTS

| | | | |
|---|---|---|---|
| 3,768,982 | 10/1973 | Kitzner et al. | 422/174 |
| 3,982,100 | 9/1976 | Hervert | 219/553 |
| 4,188,309 | 2/1980 | Völker et al. | 60/302 |
| 4,331,631 | 5/1982 | Chapman et al. | 422/180 |
| 4,407,785 | 10/1983 | Pfefferle | 423/659 |
| 4,448,833 | 5/1984 | Yamaguchi et al. | 428/116 |
| 4,582,677 | 4/1986 | Sugino et al. | 419/2 |
| 4,598,054 | 7/1986 | Mochida et al. | 501/112 |
| 4,673,658 | 6/1987 | Gadkaree et al. | 501/89 |
| 4,680,154 | 7/1987 | Matsubara et al. | 264/63 |
| 4,680,282 | 7/1987 | Blanchard et al. | 502/304 |
| 4,698,317 | 10/1987 | Inoue et al. | 501/9 |
| 4,735,656 | 4/1988 | Schaefer et al. | 75/238 |
| 4,758,272 | 7/1988 | Pierotti et al. | 75/246 |
| 4,871,621 | 10/1989 | Bagley et al. | 428/549 |
| 4,911,894 | 3/1990 | Retallick et al. | 422/174 |
| 4,976,929 | 12/1990 | Cornelison et al. | 422/174 |
| 5,009,857 | 4/1991 | Haerle | 422/180 |

FOREIGN PATENT DOCUMENTS

| | | |
|---|---|---|
| 0275372 | of 1988 | European Pat. Off. |
| 57-6974 | 2/1982 | Japan |
| 1-139906 | of 1989 | Japan |
| 89/09648 | of 1989 | WIPO |
| 89/10471 | of 1989 | WIPO |

OTHER PUBLICATIONS

World Patent Index, File Supplier, Abstract AN 89-230340, Derwent Publications Ltd., London, GB & JP-A-11 64 444 (Calsonic Corp.) 28-06-1989.
World Patent Index, File Supplier, Abstract AN 83-756542, Derwent Publications Ltd., London, GB & JP-A-58 129 493 (Mitsubishi Electric Corp.).
Patent Abstracts of Japan, vol. 12, No. 286, (M-727(, Aug. 5, 1988 & JP-A-63 062 802 (Nippon Tungsten Co., Ltd.) 19-03-1988.
Jones, W. D. "Fundamental Principles of Powder Metallurgy", 1960, Edward Arnold Pub. Ltd., pp. 739-752.

Primary Examiner—Donald P. Walsh
Assistant Examiner—Daniel Jenkins
Attorney, Agent, or Firm—Parkhurst, Wendel & Rossi

[57] ABSTRACT

A heat-resistant metallic monolith manufactured by forming metal powders into a honeycomb structure and by sintering the structure, a heat-resistant metal oxide coated on the surface of the cell walls and that of the pores thereof. Such a heat-resistant metallic monolith is manufactured by mixing metal powders, an organic binder and water to prepare a mixture, by forming the mixture into a shape of a desired honeycomb configuration, by sintering the shape in a non-oxidizing atmosphere at a temperature between 1000° and 145° C. and then by coating a heat-resistant metal oxide on a surface of the cell walls and that of the pores of the obtained sintered body.

13 Claims, 1 Drawing Sheet

HEAT-RESISTANT METAL MONOLITH AND MANUFACTURING METHOD THEREFOR

This is a Continuation of application Ser. No. 08/118,771 filed Sep. 10, 1993, now abandoned, which in turn is a Division of 07/955,247, filed Oct. 1, 1992, which issued as U.S. Pat. No. 5,292,485. The '247 application is a Continuation of application Ser. No. 07/545,488, filed Jun. 29, 1990, now abandoned.

BACKGROUND OF THE INVENTION

1. Field of the Invention

The present invention relates to a heat-resistant metallic monolith suitable for use as a catalyst carrier, a heater or a catalytic converter and a method for manufacturing such a heat-resistant metallic monolith.

2. Description of the Related Art

Conventionally, porous ceramic honeycomb structures have been employed as catalysts or carriers for catalysts for removing, for example, nitrogen oxides, carbon monoxide and hydrocarbons present in the exhaust gas of internal combustion engines, such as automobiles, or filters for removing fine particles.

Whereas porous ceramic honeycomb structures continue to be a popular and useful material in such environments, there has been a desire to develop materials exhibiting greater mechanical strength and thermal resistance in hostile environments. Accordingly, a honeycomb structure produced by winding a metal plate in a corrugated fashion has been proposed in U.K. Patent 1492929 and used.

However, in this foil type metal honeycomb structure, the catalyst layers cannot be closely adhered to the metal substrate with a coating formed thereon because of its low porosity, and a ceramic catalyst readily peels off the metal substrate due to a difference in the thermal expansion between the ceramic catalyst and the metal substrate. Furthermore, telescope phenomenon readily occurs during the run cycle in which a metal to metal joint breaks and the metal substrate deforms in such a manner that it protrudes in the direction of the flow of gas. This may disturb safe running of the vehicle. Furthermore, in the manufacture of the foil type metal honeycombs, yield of the rolling process is low, inviting high production cost.

Honeycomb structures manufactured by forming metal powders and by sintering the formed body are also known. Such honeycomb structures have been proposed in, for example, U.S. Pat. No. 4,758,272, Japanese Patent Laid-Open Nos. 57803/1982 and 57904/1982 and Japanese Patent Publication No. 6974/1982.

The honeycomb structure disclosed in U.S. Pat. No. 4,758,272 has a composition essentially consisting, as analyzed in weight percent, of 5 to 50% Al, 30 to 90% Fe, 0 to 10% Sn, 0 to 10% Cu, 0 to 10% Cr and not more than 1% Mg and/or Ca. This honeycomb structure has a porosity of about 25 to 75% by volume and a predetermined cell density.

However, since this honeycomb structure has no heat-resistant metal oxide coating formed thereon and is therefore not heat-resistant, an oxide film may be partially formed on the honeycomb structure when it is used as a filter, differentiating the characteristics, such as thermal expansion or ductility, and increasing the possibility of the honeycomb structure being broken.

The honeycomb structure disclosed in Japanese Patent Publication No. 6974/1982 is manufactured by binding a large number of small honeycomb components made of powders of catalytic activating substances which act as catalysts for use in automobile exhaust emission control, such as nickel, copper and chromium. However, oxidation process is performed at a low temperature to achieve catalytic activity, and it is therefore impossible to accomplish sufficient heat-resistance. Furthermore, this honeycomb structure is not a monolithic body and may be broken due to vibrations given to it during the operation.

The metal honeycomb structures disclosed in Japanese Patent Laid-Open Nos. 57803/1982 and 57804/1982 are manufactured by preparing mixture of metal powders, a thermosetting binder, colloidal silica and so on, by forming the mixture into a honeycomb configuration by extrusion and then sintering the shaped body after it has been hardened. Like U.S. Pat. No. 4,758,272, however, Japanese Patent Laid-Open Nos. 57803/1982 and 57804/1982 do not disclose the provision of a heat-resistant coating. Therefore, these metal honeycomb structures may be broken when used as, for example, a catalyst carrier.

SUMMARY OF THE INVENTION

An object of the present invention is to provide a metallic honeycomb monolith which exhibits high resistance to heat, corrosion and oxidation and excellent ductility and a method of manufacturing such a metallic honeycomb monolith.

To this end, the present invention provides a heat-resistant metallic monolith comprising a metal monolith and a heat-resistant metal oxide coated on a surface of cell walls and that of pores in the metal monolith. The metal monolith is manufactured by forming metal powders into a shape of a honeycomb configuration and by sintering the shape.

The present invention also provides a method of manufacturing such a heat-resistant metallic monolith which comprises the steps of preparing a mixture of metal powders, an organic binder and water, forming the mixture into a shape of a desired honeycomb configuration, sintering the shape in a non-oxidizing atmosphere at a temperature between 1000° and 1450° C. and coating a heat-resistant metal oxide on a surface of cell walls and that of pores of the obtained sintered body.

Extrusion, press shaping or slip casting etc. may be employed as forming or shaping method, and the extrusion (extruding method) is preferably employed.

The thus-obtained heat-resistant metallic monolith can be used as a catalyst carrier or a filter for removing the fine particles contained in the exhaust gas of automobiles. The heat-resistant metallic monolith of the present invention can also be employed to manufacture a heater. Manufacture of the heater is achieved by the provision of electrodes on the metallic monolith.

The heat-resistant metallic monolith of the present invention can also be employed to manufacture a catalytic converter. The catalytic converter may be manufactured by placing a catalyst on the metallic monolith and by providing electrodes on the metallic monolith. Also, the heat-resistant metallic monolith of the present invention can be employed to manufacture a catalytic converter which comprises a main monolith catalyst and a heater disposed adjacent to and upstream of the main monolith catalyst. This heater may be obtained by providing electrodes on the metallic monolith according to the present invention and by placing a catalyst on the metallic monolith, if necessary.

In the preferred form, the metal monolith has a composition consisting essentially of 2.5 to 30% by weight of Al, 0 to 40% by weight of Cr and a balance of Fe.

DETAILED DESCRIPTION OF THE INVENTION

The heat-resistant metallic monolith according to the present invention has a heat-resistant metal oxide coated on a surface of cell walls and that of pores of a metal monolith.

Hence, the heat-resistant metallic monolith contemplated in the present invention exhibits high resistance to heat and oxidation and therefore substantially eliminates the possibility of breakage which would occur when it is used as a catalyst carrier, filter, honeycomb heater or a catalytic converter for use in automobile exhaust emission control.

Figure 1:
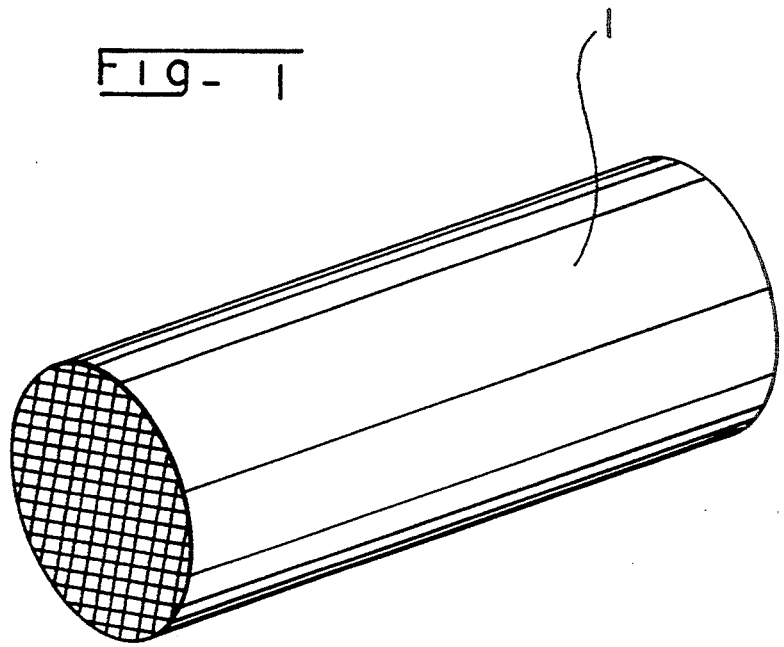
FIG. 1 is a perspective view of a honeycomb monolith according to the present invention.
Figure 2:
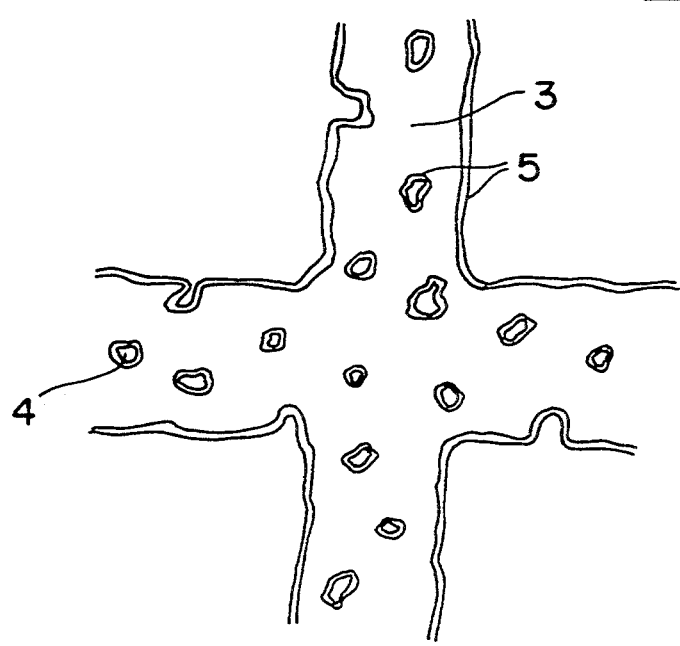
FIG. 2 is a cross-sectional view of cell walls of the honeycomb monolith of FIG. 1, showing the pore structure and metal oxide coating.

FIGS. 1 and 2 show honeycomb monolith 1 and a partial cross-section of cell walls 3 of honeycomb monolith 1, wherein metal oxide coating 5 coats pores 4 and the outer surfaces of cell walls 3.

The composition of the metal monolith according to the present invention consists essentially, as analyzed in weight percent, of 2.5 to 30% Al, 0 to 40% Cr and a balance of Fe. The preferred proportion of Al is between 12 and 25% when the level of Cr is between 0 to 10%, and between 3 and 20% when the level of Cr exceeds 10%. The preferred level of Cr is between 10 and 25%. When the proportion of Al is less than 2.5%, resistance to oxidation at high temperature deteriorates. Inclusion of more than 30% Al increases brittleness of the products and deteriorates the characteristics thereof inherent in metals. Inclusion of more than 40% Cr further increases brittleness of the products and production cost.

In the metal monolith according to the present invention, 0 to 10% Sn and 0 to 10% Cu may also be present. Although presence of these elements lowers the sintering temperature, it deteriorates resistance to oxidation. The preferred proportion should therefore be at most 10% in total.

Preferably, the sum of Fe, Al and Cr constitutes 90% or more of the total composition. Below 90% of the sum of Fe, Al and Cr the heat-resistance and ductility of the metal monolith deteriorate.

Presence of Mg and Ca promotes the sintering. However, it deteriorates the characteristics of the metal monolith, such as resistance to oxidation, and it is therefore desirable for them not to be present.

The preferred contents of C and N in the metal monolith according to the present invention is respectively 1% or below, and that of O is 3% or below.

Any heat-resistant metal oxide can be coated on the surface of the cell walls and that of the pores in the metal monolith according to the invention. Examples of such metal oxides include $Al_2O_3$ and $Cr_2O_3$.

The heat-resistant metallic monolith, having the above-described composition and structure, can be used as a catalyst carrier or a filter for removing the fine particles contained in the exhaust gas of automobiles.

The heat-resistant metallic monolith of the present invention can also be employed to manufacture a heater for domestic use, such as a hot air heater, or an industrial heater, such as a heater or a preheater for use in automobile exhaust emission control. Manufacture of these heaters or a preheater is achieved by the provision of electrodes on the heat-resistant metallic monolith.

The heat-resistant metallic monolith of the present invention can also be employed to manufacture a catalytic converter which is achieved by placing a catalyst on the metallic monolith and by providing electrodes on the metallic monolith. Also, the heat-resistant metallic monolith of the present invention can be employed to manufacture a catalytic converter which comprises a main monolith catalyst and a heater disposed adjacent to and upstream of the main monolith catalyst. The heater can be obtained by providing electrodes on the metallic monolith according to the present invention and by placing a catalyst on the metallic monolith, if necessary. These catalytic converters can be desirably employed in the control of automobile exhaust emission.

The method of manufacturing the heat-resistant metallic monolith according to the present invention will be described below.

First, Fe powder, Al powder and Cr powder, or powders of alloys of these metals, with optional additions of Sn powder and Cu powder, are mixed to prepare a metal powder mixture having a composition consisting essentially of, as analyzed in weight percent, 2.5 to 30% Al, 0 to 40% Cr and a balance of Fe with the sum Al, Cr and Fe constituting 90% or more of the total composition. These metal powders may be produced by, for example, the carbonyl process, pulverization, atomization, reduction, or an electrolytic method. The particle size of the metal powders is dependent on the wall thickness of the cells of the honeycomb structure. For example, in case of extrusion, it is practically desirable that the largest particle size be about two thirds of that of an extruding die slit. Preferably, the contents of C, O and N in the metal powder mixture are respectively 10% or less, 3% or less and 1% or less. In the case of extrusion, the metal powder mixture is blended into an organic binder, such as methyl cellulose or polyvinylalcohol, and water to produce a formable mixture, and that mixture is then formed into a shape of a desired honeycomb configuration by extrusion.

When the metal powder mixture is blended into the organic binder and water, prior to the addition of water, an antioxidant, such as oleic acid, may be added to the metal powder mixture. Alternatively, powders of metals which are subjected to anti-oxidation process may be employed.

The use of an oxide as a forming aid or the like disturbs sintering and is therefore undesirable.

Next, the shaped honeycomb body is sintered in a non-oxidizing atmosphere at a temperature ranging between 1000° and 1450° C. During the sintering in the non-oxidizing atmosphere containing hydrogen, the organic binder is decomposed and thereby removed with Fe or the like acting as a catalyst, and a good sintered body (a metal monolith) can therefore be obtained.

If the sintering temperature is lower than 1000° C., sintering is not achieved. Sintering conducted at a temperature higher than 1450° C. causes deformation of the resulting sintered body or increases production cost and is therefore undesirable.

The sintering time is appropriately determined such that the contents of C, N and O are within the above-described range. The preferred length of time is 2 hours or longer.

Thereafter, a heat-resistant metal oxide is coated on the surface of the cell walls and that of the pores of the obtained sintered body by any of the following methods:

(1) the metal monolith is subjected to the heat-treatment in an oxidizing atmosphere at a temperature ranging between 700° to 1100° C.

(2) Al or the like is plated on the surface of the cell walls and that of the pores of the sintered body (the metal monolith) (e.g., vapor plating) and that sintered body is subjected to the heat-treatment in an oxidizing atmosphere at a temperature between 700° and 1100° C.

(3) the metal monolith is dipped into a molten metal, such as Al, and that metal monolith is subjected to the heat-treatment in an oxidizing atmosphere at a temperature between 700° and 1100° C.

(4) alumina sol or the like is coated on the surface of the cell walls and that of the pores of the sintered body (the metal monolith) and that sintered body is subjected to the heat-treatment in an oxidizing atmosphere at a temperature between 700° and 1100° C.

To enhance resistance to heat and oxidation, heat-treatment conducted at a temperature ranging between 900° and 1100° C. is preferred.

Although the thus-obtained heat-resistant metallic monolith may have any honeycomb configuration, in a metallic monolith which is designed for use as a catalyst carrier, heater and/or catalytic converter, the cell density ranges from 6 to 1500 cells/in$^2$ (0.9 to 233 cells/cm$^2$) with a cell wall thickness ranging from 50 to 2000 $\mu$m.

To achieve sufficient mechanical strength and resistance to oxidation and corrosion, the porosity of the heat-resistant metallic monolith will be held between 0 and 50% by volume and more preferably less than 25% by volume In a heat-resistant metallic monolith designed for use as a catalyst carrier, the porosity will be held 5% or above to ensure close contact between the metallic monolith and a catalyst layer.

Illustrating the heat-resistance of the heat-resistant metallic monolith with a heat-resistant metal oxide coated on the surface of the cell walls and that of the pores thereof according to the present invention, it is desired that an increase in the weight of a metallic monolith after being fired for 1000 hours in an atmosphere at 900° C. be within 10% by weight of the total weight.

The term, "honeycomb monolith or honeycomb structure" is employed in this application to refer to an integral body having a large number of passages partitioned by the walls, as shown in FIG. 1. The passages have any cross-sectional form (cell shape), e.g., a circular, polygonal or corrugated form.

The present invention will further be illustrated in the following examples which are intended to be illustrative, but not limiting, of this invention.

EXAMPLE 1

Fe powder prepared by the carbonyl process, Al powder prepared by atomization, Cr powder prepared by the electrolytic method, Fe—Al alloy powder prepared by pulverization and Fe—Cr alloy powder prepared by atomization, all having a particle size of 300 mesh or less, were mixed to prepare mixtures having the compositions listed in Table 1. Thereafter, each mixture was blended first into 5% by weight of methyl cellulose which served as an organic binder and 2% by weight of oleic acid which served as a lubricant and as an antioxidant of the metal powders then 20% by weight of water, to produce a formable admixture.

The obtained admixture was deaerated by means of a pug mill and then extruded through a die to form square cell honeycomb structure having a diameter of 100 mm, a cell wall thickness of 75 $\mu$m and a cell density of 62 cells/cm$^2$.

After the shaped honeycomb structure was dried, it was sintered for 4 hours in hydrogen or hydrogen/argon atmosphere at a temperature between 1200° and 1450° C. and then fired in an atmosphere for 2 hours at a temperature between 900° and 1100° C. to form an oxide film on the surface thereof.

The porosity, oxidation resistance (represented by an increase in weight caused by firing in an atmosphere for 1000 hours at 900° C.) and corrosion resistance (represented by a reduction in weight caused by dipping in an aqueous solution of HCl having pH of 1 for 1 hour) of the obtained honeycomb structures were measured. The results of the measurements are also shown in Table 1. The porosity was measured by the Archimedes' method.

As can be seen from Table 1, inclusion of less than 2.5% by weight of Al is disadvantageous to provide heat-resistant alumina film and therefore deteriorates oxidation resistance. Inclusion of more than 30% by weight of Al, provides undersintering and deteriorates oxidation resistance.

TABLE 1

| Example No. | Reference 1 | Present invention | | | | | | |
|---|---|---|---|---|---|---|---|---|
| | | 2 | 3 | 4 | 5 | 6 | 7 | 8 |
| Composition (wt %) | | | | | | | | |
| Fe | 98 | 95 | 88 | 76 | 70 | 83 | 70 | 55 |
| Al | 2 | 5 | 12 | 24 | 30 | 5 | 5 | 5 |
| Cr | 0 | 0 | 0 | 0 | 0 | 12 | 25 | 40 |
| Batch composition (wt %) (300 mesh or less) | | | | | | | | |
| Fe Powder | 98 | 95 | 76 | 52 | 50 | 83 | 45 | 50 |
| Al Powder | 2 | 5 | | | 10 | 5 | 5 | |
| Cr Powder | | | | | | 12 | | 40 |
| Fe-50Al Powder | | | 24 | 48 | 40 | | | 10 |
| Fe-50Cr Powder | | | | | | | 50 | |
| Sintering temperature (°C.) (Hydrogen atmosphere) | 1200 | 1200 | 1200 | 1200 | 1200 | 1300 | 1300 | 1350 |
| Heat-treatment temperature | 1000 | 1000 | 1000 | 1000 | 1000 | 900 | 900 | 900 |

TABLE 1-continued

| | | | | | | | | |
|---|---|---|---|---|---|---|---|---|
| (°C.) | | | | | | | | |
| Porosity (%) | 63 | 50 | 44 | 36 | 21 | 24 | 19 | 16 |
| Resistance to oxidation (wt %) (An increase in weight caused by thermo-aging 1000 hours at 900° C.) | 13.6 | 9.8 | 8.6 | 5.3 | 3.5 | 3.6 | 2.4 | 3.0 |
| Resistance to corrosion (%) (Reduction of weight caused by dipping 1 hour in HCl solution of pH 1) | 5.7 | 4.1 | — | 1.5 | 0.8 | — | 0.2 | — |

| | Reference | Present invention | | | Reference |
|---|---|---|---|---|---|
| Example No. | 9 | 10 | 11 | 12 | 13 |
| Composition (wt %) | | | | | |
| Fe | 78 | 75 | 68 | 55 | 35 |
| Al | 2 | 5 | 12 | 20 | 35 |
| Cr | 20 | 20 | 20 | 25 | 30 |
| Batch composition (wt %) (300 mesh or less) | | | | | |
| Fe Powder | 78 | 50 | 48 | 35 | 35 |
| Al Powder | 2 | | 12 | | 35 |
| Cr Powder | 20 | | | 25 | 30 |
| Fe-50Al Powder | | 10 | | 40 | |
| Fe-50Cr Powder | | 40 | 40 | | |
| Sintering temperature (°C.) (Hydrogen atmosphere) | 1250 | 1250 | 1300 | 1300 | 1300 |
| Heat-treatment temperature (°C.) | 1100 | 1100 | 1100 | 1100 | 1100 |
| Porosity (%) | 27 | 24 | 36 | 46 | 53 |
| Resistance to oxidation (wt %) (An increase in weight caused by thermo-aging 1000 hours at 900° C.) | 11.6 | 3.2 | 4.5 | 6.1 | 10.8 |
| Resistance to corrosion (%) (Reduction of weight caused by dipping 1 hour in HCl solution of pH 1) | — | — | — | — | — |

| | Present invention | | | | | | |
|---|---|---|---|---|---|---|---|
| Example No. | 14 | 15 | 16 | 17 | 18 | 19 | 20 |
| Composition (wt %) | | | | | | | |
| Fe | 77.5 | 76 | 76 | 63 | 72 | 85 | 70 |
| Al | 2.5 | 4 | 12 | 12 | 3 | 3 | 8 |
| Cr | 20 | 20 | 12 | 25 | 25 | 12 | 22 |
| Batch composition (wt %) (300 mesh or less) | | | | | | | |
| Fe Powder | 55 | 52 | 52 | 26 | 49 | 70 | 60 |
| Al Powder | | | | | | | |
| Cr Powder | | | | | 5 | | |
| Fe-50Al Powder | 5 | 8 | 24 | 24 | 6 | 6 | 16 |
| Fe-50Cr Powder | 40 | 40 | 24 | 50 | 40 | 24 | 44 |
| Sintering temperature (°C.) (Hydrogen atmosphere) | 1250 | 1400 | 1400 | 1450 | 1370 | 1350 | 1430 |
| Heat-treatment temperature (°C.) | 1100 | 1100 | 1050 | 1100 | 1100 | 1050 | 1100 |
| Porosity (%) | 25 | 8 | 22 | 10 | 12 | 13 | 9 |
| Resistance to oxidation (wt %) (An increase in weight caused by thermo-aging 1000 hours at 900° C.) | 9.7 | (1.0) | (3.0) | (1.9) | (4.8) | (7.1) | (2.0) |
| Resistance to corrosion (%) (Reduction of weight caused by dipping 1 hour in HCl solution of pH 1) | — | — | — | — | — | — | — |

EXAMPLE 2

Fe powder, Al powder, Cr powder, Fe—Al alloy power and Fe—Cr alloy powder, having a particle size of 300 mesh or less and prepared in the same manner as Example 1, were mixed with Cu powder and Sn powder, having a particle size of 300 mesh or less, to prepare various powder mixtures having the compositions listed in Table 2, and honeycomb structures were manufactured using those mixtures in the same manner as that of Example 1.

The porosity and oxidation resistance of the obtained honeycomb structures were measured. The results of the measurements are shown in Table 2.

As is clear from Table 2, addition of Cu and Sn powders lowers the sintering temperature or decreases the porosity in the case of the sintering performed at the same temperature. However, introduction of Cu and Sn powders deteriorates oxidation resistance, and should therefore be restricted less than 10% by weight in total.

TABLE 2

| Example No. | Present invention 21 | 22 | Reference 23 | Present invention 24 | 25 | Reference 26 |
|---|---|---|---|---|---|---|
| Composition (wt %) | | | | | | |
| Fe | 70 | 65 | 60 | 70 | 65 | 60 |
| Al | 5 | 5 | 5 | 5 | 5 | 5 |
| Cr | 20 | 20 | 20 | 20 | 20 | 20 |
| Cu | 5 | 10 | 15 | | | |
| Sn | | | | 5 | 10 | 15 |
| Batch composition (wt %) (300 mesh or less) | | | | | | |
| Fe powder | 45 | 40 | 35 | 45 | 40 | 35 |
| Fe-50Al powder | 10 | 10 | 10 | 10 | 10 | 10 |
| Fe-50Cr powder | 40 | 40 | 40 | 40 | 40 | 40 |
| Cu powder | 5 | 10 | 15 | | | |
| Sn powder | | | | 5 | 10 | 15 |
| Sintering temperature (°C.) (Hydrogen-argon atmosphere) | 1100 | 1100 | 1050 | 1100 | 1100 | 1050 |
| Heat-treatment temperature (°C.) | 1000 | 1000 | 950 | 1000 | 1000 | 950 |
| Porosity (%) | 32 | 28 | 30 | 35 | 30 | 31 |
| Resistance to oxidation (wt %) (An increase in weight caused by thermo-aging 1000 hours at 900° C.) | 5.3 | 7.1 | 12.3 | 5.9 | 7.7 | 11.9 |

| Example No. | Present invention 27 | Reference 28 | 29 | Present invention 30 | 31 | 32 |
|---|---|---|---|---|---|---|
| Composition (wt %) | | | | | | |
| Fe | 65 | 63 | 65 | 70 | 71 | 70 |
| Al | 5 | 5 | 5 | 5 | 24 | 5 |
| Cr | 20 | 20 | 20 | 20 | | 20 |
| Cu | 5 | 6 | 5 | 4.5 | 4.5 | 4.5 |
| Sn | 5 | 6 | 5 | 0.5 | 0.5 | 0.5 |
| Batch composition (wt %) (300 mesh or less) | | | | | | |
| Fe powder | 40 | 38 | 40 | 45 | 47 | 45 |
| Fe-50Al powder | 10 | 10 | 10 | 10 | 48 | 10 |
| Fe-50Cr powder | 40 | 40 | 40 | 40 | | 40 |
| Cu powder | 5 | 6 | 5 | 4.5 | 4.5 | 4.5 |
| Sn powder | 5 | 6 | 5 | 0.5 | 0.5 | 0.5 |
| Sintering temperature (°C.) (Hydrogen-argon atmosphere) | 1050 | 1050 | 950 | 1300 | 1300 | 1350 |
| Heat-treatment temperature (°C.) | 1000 | 1000 | 900 | 1050 | 1000 | 1100 |
| Porosity (%) | 26 | 24 | 38 | 8 | 7 | 5 |
| Resistance to oxidation (wt %) (An increase in weight caused by thermo-aging 1000 hours at 900° C.) | 6.9 | 10.6 | 13.4 | 2.8 | 2.9 | 2.3 |

What is claimed is:

1. A method of manufacturing a heat-resistant metallic monolith, comprising the steps of:
    forming a mixture comprising organic binder, water and a metal powder mixture which consists essentially of 2.5 to 30% by weight Al, 0 to 40% by weight Cr and a balance of Fe;
    forming said mixture into a honeycomb body having a plurality of cell walls which define cells;
    sintering said honeycomb body in a non-oxidizing atmosphere at a temperature between 1,000° and 1,450° C. to form a porous sintered honeycomb body; and
    forming a heat-resistant metal oxide comprised of α-alumina on said cell walls and in pores of said porous sintered honeycomb body.

2. The method of claim 1, wherein said step of forming said heat-resistant metal oxide comprises coating a metal on said cell walls and in said pores, and heat-treating the thus coated honeycomb body in an oxidizing atmosphere.

3. The method of claim 2, wherein said metal is Al.

4. The method of claim 2, wherein the coating of said metal comprises plating said metal or dipping the porous sintered honeycomb structural body in molten metal.

5. The method of claim 2, wherein said heat-treatment is carried out at a temperature between 700° and 1,100° C.

6. The method of claim 5, wherein said temperature is between 900° and 1,100° C.

7. The method of claim 1, wherein said step of forming the heat-resistant metal oxide comprises heat-treating the porous sintered honeycomb body under an oxidizing atmosphere.

8. The method of claim 7, wherein said heat-treatment is carried out a temperature between 700° and 1,100° C.

9. The method of claim 8, wherein said temperature is between 900° and 1,100° C.

10. The method of claim 1, wherein said step of forming said heat-resistant metal oxide comprises coating a sol containing said heat-resistant metal oxide on said cell walls and in said pores, and heat-treating the thus coated honeycomb body under an oxidizing atmosphere.

11. The method of claim 10, wherein said heat-treatment is carried out a temperature between 700° and 1,100° C.

12. The method of claim 11, wherein said temperature is between 900° and 1,100° C.

13. A method of manufacturing a heat-resistant metallic monolith, comprising the steps of:

forming a mixture comprising organic binder, water and a metal powder mixture which consists essentially of 2.5 to 30% by weight Al, 0 to 40% by weight Cr, 0 to 10% by weight Sn, 0 to 10% by weight Cu and a balance of Fe;

forming said mixture into a honeycomb body having a plurality of cell walls which define cells;

sintering said honeycomb body in a non-oxidizing atmosphere at a temperature between 1,000° and 1,450° C. to form a porous sintered honeycomb body; and forming a heat-resistant metal oxide comprised of α-alumina on said cell walls and in pores of said porous sintered honeycomb body.

* * * * *